Aug. 12, 1958 W. J. ROOS 2,847,082

ELECTROSTATIC PRECIPITORS

Filed Nov. 3, 1955

William J. Roos
Inventor
by Robert T. Palmer
Attorney

United States Patent Office 2,847,082
Patented Aug. 12, 1958

2,847,082
ELECTROSTATIC PRECIPITATORS

William J. Roos, Sharon, Mass., assignor to Westinghouse Electric Corporation, East Pittsburgh, Pa., a corporation of Pennsylvania Application November 3, 1955, Serial No. 544,628

3 Claims. (Cl. 183—7)

This invention relates to electrostatic precipitators for removing small foreign particles such as dust, from gases such as air.

It has been proposed to provide collector units of intermeshed dielectric filaments which are given electrostatic charges, and many forms of such units have been constructed and tested. They all have the fault that as the humidity of the air being cleaned increases, the moisture absorbed by the filaments or which collects on the filaments increases their conductivity and decreases their efficiency.

This invention uses metal wool as a collector in an electrostatic precipitator. The metal wool is insulated from ground, and is electrostatically charged by an electrostatic field between insulated conductors in contact with its upstream and downstream sides. Such a collector unit is no more expensive than the glass or fibre wool types, and experiments have shown as high efficiency as such types have when handling relatively dry air, and higher efficiencies than such types have when handling relatively humid air.

Objects of this invention are to supply inexpensive disposable collector units which are not adversely affected by moisture.

This invention will now be described with reference to the annexed drawings, of which:

Figure 1:
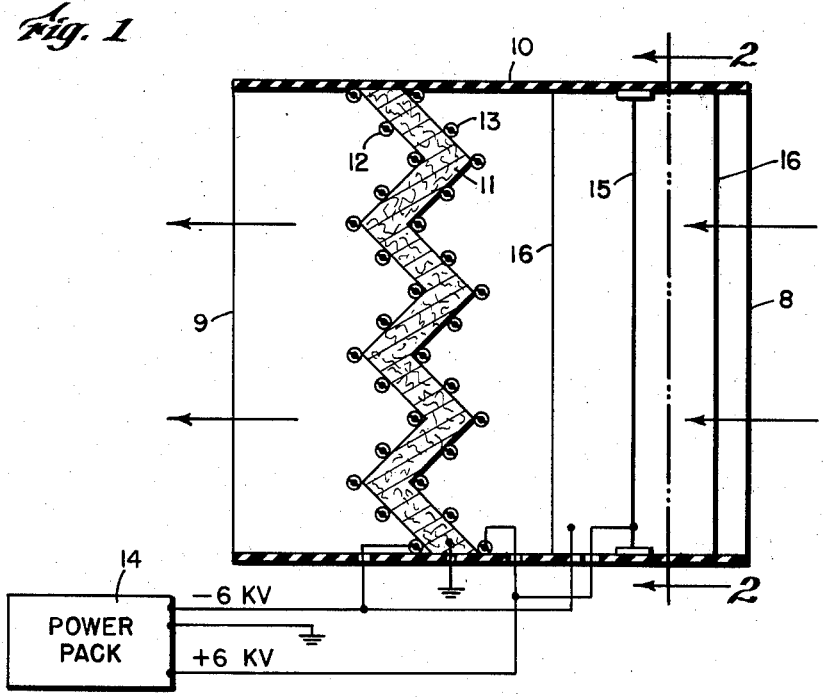
Fig. 1 is a side section of an electrostatic precipitator embodying this invention, with power pack connected thereto.
Figure 2:
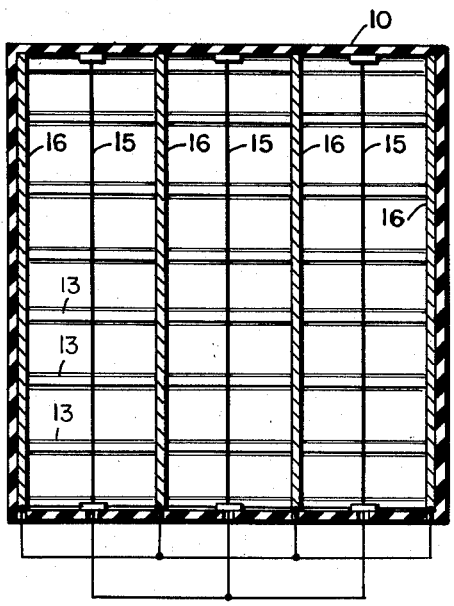
Fig. 2 is a section along the line 2—2 of Fig. 1.

A rectangular casing 10 of electric insulation has an open air inlet 8 at one end and an open air outlet 9 at its other end. A mat 11 of metal wool, preferably of aluminum wool, is folded in a zig-zag path within the casing with its upper and lower ends in contact with the top and bottom walls of the casing and held in position by friction as though being force-fitted.

Spaced apart, parallel, horizontally extending, insulated conductors 12 are placed in contact with the downstream side of the mat 11, and similarly arranged insulated conductors 13 are placed in contact with the upstream side of the mat. The insulation on the conductors preferably would be attached to the mat by being cemented thereto.

The downstream conductors 12 are connected to the −6 kv. terminal of a high voltage power pack of the type disclosed in the E. G. Hills U. S. Patent No. 2,640,559, and the upstream conductors 13 are connected to the +6 kv. terminal of the pack which has a grounded center tap. The mat 11 is connected to ground. There is a 12 kv. difference in potential between the conductors 12 and 13, and the electrostatic fields between the conductors charge the mat electrostatically.

A conventional ionizer consisting of fine wires 15 supported from the walls of the casing midway between non-discharging ionizer electrodes in the form of metal plates 16 may be used with the wires connected to the +6 kv. terminal of the power pack, and the plates 16 being connected to the −6 kv. terminal of the power pack. A 12 kv. difference in potential is thus impressed between the ionizer wires and the plates 16.

Figure 3:
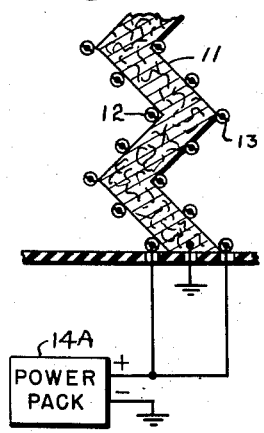
Fig. 3 is a view showing other power pack connections.

Fig. 3 shows a single voltage power pack 14A with its positive terminal connected to conductors 12 and 13, and its negative terminal grounded. The positive terminal would also be connected to the ionizer wires. There are electrostatic fields between the conductors 12 and the grounded mat, and between the conductors 13 and the grounded mat, which fields charge the mat electrostatically.

In operation, the dust particles in the air to be cleaned are given positive electrostatic charges as they pass through the ionizer, and are collected by the charged mat 11. The mat is relatively inexpensive so that it is economical to discard it after it has been loaded with dust, and to replace it with a new one.

What I claim as my invention, is:

1. An electrostatic precipitator comprising an air guiding enclosure having an open air inlet and an open air outlet, a mat of conductive filaments extending crosswise said enclosure between said inlet and outlet, a first plurality of spaced-apart conductors having insulation therearound in contact with the side of said mat facing said inlet, a second plurality of spaced-apart conductors having insulation therearound in contact with the side of said mat facing said outlet, and means for establishing electrostatic fields between said first conductors and said mat and between said second conductors and said mat.

2. An electrostatic precipitator as claimed in claim 1 in which the field establishing means comprises a power supply having a grounded terminal connected to said mat, having a positive terminal at a voltage above ground connected to the conductors of one of said pluralities, and having a negative terminal at a voltage below ground connected to the conductors of the other of said pluralities.

3. An electrostatic precipitator as claimed in claim 1 in which the field establishing means comprises a power supply having a terminal of one polarity connected to said first and second conductors, and having a terminal of the opposite polarity connected to said mat.

References Cited in the file of this patent

UNITED STATES PATENTS

| | | |
|---|---|---|
| 1,992,974 | Thompson | Mar. 5, 1935 |
| 2,297,601 | Williams | Sept. 29, 1942 |
| 2,579,441 | Palmer | Dec. 18, 1951 |